US010751662B2

(12) United States Patent
Seo et al.

(10) Patent No.: US 10,751,662 B2
(45) Date of Patent: Aug. 25, 2020

(54) GAS FILTER

(71) Applicant: AMOGREENTECH CO., LTD., Gimpo-si (KR)

(72) Inventors: In Yong Seo, Seoul (KR); Ui Young Jeong, Incheon (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 73 days.

(21) Appl. No.: 15/572,351

(22) PCT Filed: May 18, 2016

(86) PCT No.: PCT/KR2016/005235
§ 371 (c)(1),
(2) Date: Nov. 7, 2017

(87) PCT Pub. No.: WO2016/195285
PCT Pub. Date: Dec. 8, 2016

(65) Prior Publication Data
US 2018/0126316 A1      May 10, 2018

(30) Foreign Application Priority Data
Jun. 1, 2015    (KR) .................. 10-2015-0077319

(51) Int. Cl.
*B01D 39/00* (2006.01)
*B01D 46/52* (2006.01)
(Continued)

(52) U.S. Cl.
CPC .......... *B01D 46/525* (2013.01); *B01D 39/08* (2013.01); *B01D 39/1607* (2013.01);
(Continued)

(58) Field of Classification Search
CPC ...... B01D 46/00; B01D 46/525; B01D 39/00; B01D 39/08; B01D 39/1607;
(Continued)

(56) References Cited

U.S. PATENT DOCUMENTS 2,178,614 A    11/1939  Slayter
4,478,620 A *  10/1984  Tamura ............... B01D 39/163
                                                  210/490
(Continued)

FOREIGN PATENT DOCUMENTS

JP         04247207       3/1992
JP         3434587        8/2003
(Continued)

OTHER PUBLICATIONS

International Search Report—PCT/KR2016/005235 dated Nov. 2, 2016.

*Primary Examiner* — T. Bennett McKenzie
(74) *Attorney, Agent, or Firm* — Cantor Colburn LLP

(57) ABSTRACT

Provided is a gas filter, which includes an adsorptive membrane for adsorbing foreign substances contained in a gas, wherein the adsorptive membrane has a corrugated structure folded in a number of times or a structure having a plurality of projections, in order to increase a contact surface area of the gas per unit area, and wherein the adsorptive membrane includes: a support member having a plurality of first pores; and a first adsorptive member which is stacked on the support member and has a plurality of second pores formed therein and which is made by accumulating ion exchange nanofibers for adsorbing foreign substances.

9 Claims, 6 Drawing Sheets

(51) Int. Cl.
*B01D 53/00* (2006.01)
*B01D 53/04* (2006.01)
*B01D 53/22* (2006.01)
*B01D 39/08* (2006.01)
*B01D 39/16* (2006.01)
*B01D 67/00* (2006.01)
*B01D 69/12* (2006.01)
*B01D 69/10* (2006.01)
*B01D 69/02* (2006.01)
*B01D 71/02* (2006.01)

(52) U.S. Cl.
CPC ......... *B01D 39/1692* (2013.01); *B01D 53/00* (2013.01); *B01D 53/0407* (2013.01); *B01D 53/228* (2013.01); *B01D 67/0004* (2013.01); *B01D 69/02* (2013.01); *B01D 69/10* (2013.01); *B01D 69/12* (2013.01); *B01D 71/022* (2013.01); *B01D 2239/025* (2013.01); *B01D 2239/0407* (2013.01); *B01D 2239/0654* (2013.01); *B01D 2257/60* (2013.01); *B01D 2257/91* (2013.01); *B01D 2258/06* (2013.01); *B01D 2279/30* (2013.01); *B01D 2279/40* (2013.01); *B01D 2325/42* (2013.01); *B01D 2325/48* (2013.01)

(58) Field of Classification Search
CPC ............... B01D 39/1692; B01D 53/00; B01D 53/0407; B01D 53/228; B01D 63/14; B01D 2257/60; B01D 2257/91; B01D 2258/06; B01D 2279/30; B01D 2279/40; B01D 2239/025; B01D 2239/04–0492; B01D 2239/0654
USPC .......................................................... 55/521
See application file for complete search history.

(56) References Cited

U.S. PATENT DOCUMENTS

| | | | | |
|---|---|---|---|---|
| 5,183,098 | A | * | 2/1993 | Chagnot ............... F24F 3/1423 165/54 |
| 5,525,136 | A | * | 6/1996 | Rosen .................. B01D 39/083 55/486 |
| 2004/0118765 | A1 | * | 6/2004 | Yavorsky ........... B01D 39/1623 210/290 |
| 2007/0045176 | A1 | * | 3/2007 | Chandra ................. C02F 1/004 210/501 |
| 2008/0230471 | A1 | * | 9/2008 | Tamada ............... B01D 39/163 210/505 |
| 2010/0181249 | A1 | * | 7/2010 | Green ................ B01D 39/1623 210/493.1 |
| 2010/0326028 | A1 | * | 12/2010 | Sundet ............... B01D 39/1623 55/499 |
| 2014/0165517 | A1 | * | 6/2014 | Hara ...................... B01D 46/10 55/486 |
| 2014/0209534 | A1 | * | 7/2014 | Liu .................... B01D 39/2017 210/502.1 |

FOREIGN PATENT DOCUMENTS

| | | |
|---|---|---|
| JP | 2014144420 | 8/2014 |
| KR | 20010013300 | 2/2001 |
| KR | 100323298 | 6/2002 |
| KR | 200337043 | 1/2004 |
| KR | 100507969 | 8/2005 |
| KR | 20110085096 | 7/2011 |
| KR | 20120082840 | 7/2012 |
| KR | 101417988 | 8/2014 |
| KR | 20140139176 | 12/2014 |
| KR | 101491994 | 2/2015 |
| KR | 20150017298 | 2/2015 |

* cited by examiner

GAS FILTER

TECHNICAL FIELD

The present disclosure relates to a gas filter, and more particularly, to a gas filter which maximizes a flow rate of a gas, prevents deformation and damage of an adsorptive membrane, improves the adsorption efficiency, and obtains excellent reliability.

BACKGROUND ART

In recent years, industrial developments have caused various environmental problems due to pollutants caused by rapid economic growth, population growth and urbanization.

That is, pollutants such as wastewater, heavy metals, dust and harmful gas are discharged from manufacturing plants and industrial facilities of various industries, living facilities, automobiles and motorcycles, thereby polluting air and water quality.

These pollutants are interfering with the life of human being who wants to live pleasant and healthy life, and various solutions to purify the pollutants have been sought, and the research and development for this have been continuously and variously continued.

An example technique for purifying contaminants is to filter the contaminated gas through a membrane.

Membranes can separate and filter only certain components from gases, liquids, solids or mixtures thereof, and the mixture is filtered using the physicochemical properties of the membrane.

Filters that filter contaminants by using such membranes are widely used in various industrial fields. Particularly, there are various types of gas filters for purifying contaminated air. In order to have more advanced functions, research on gas filters has been conducted continuously.

Meanwhile, a polymer membrane which can be applied to a membrane of a gas filter is prepared by casting a polymer solution to form a sheet, and then immersing the formed sheet in a solid phase. Polymer membranes are used as a wide range of membranes.

Korean Patent Application Publication No. 2011-85096 proposed a composite filter in which activated carbon fibers and ion exchange fibers are laminated on a side wall of a housing. However, there was a disadvantage that the size of the filter is large in the form of a composite filter.

Korean Patent Registration Publication No. 507969 proposed a technique of producing a web by forming a web of ion exchange fiber on an ion exchange nonwoven fabric, sprinkling ion exchange resin on the web, placing an ion exchange nonwoven fabric thereon, and removing ionic gas such as acidic or alkaline present in a clean room of a semiconductor manufacturing process, with a non-woven type composite ion exchange filter using needle punching. However, since the pores of the nonwoven fabric are large, the very fine harmful dust cannot be filtered, and the ion exchange resin sprayed on the ion exchange nonwoven fabric may flow to thereby cause an additional source of pollution to occur.

Korean Patent Registration Publication No. 1491994 discloses a membrane for a gas filter including a porous support that is prepared by electrospinning a spinning solution through a nozzle having a ratio of the distance from the tip of the nozzle and the distance from the center of the nozzle is 1.01 to 1.1 in which polyimide nanofibers are bonded in the form of a non-woven fabric having a plurality of pores.

However, when the membrane for a gas filter is implemented solely into a gas filter, and the gas passes through the gas filter at high speed, damage or deformation of the membrane occurs to cause lowering of reliability.

DISCLOSURE

Technical Problem

To overcome the above problems, it is an object of the present disclosure to provide a gas filter capable of maximizing the flow rate of gas and improving the adsorption performance of foreign substances.

It is another object of the present disclosure to provide a gas filter capable of preventing deformation and damage of an adsorptive membrane even if a high velocity and a large amount of gas passes through the gas filter.

It is another object of the present disclosure to provide a gas filter capable of obtaining an excellent antibacterial property by including an adsorptive member made by accumulating nanofibers containing an antibacterial substance or by performing a silver yarn stitching process on a membrane.

Technical Solution

In order to achieve the above object, a gas filter according to an embodiment of the present disclosure comprises an adsorptive membrane for adsorbing foreign substances contained in a gas, wherein the adsorptive membrane has a corrugated structure folded in a number of times or a structure having a plurality of projections, in order to increase a contact surface area of the gas per unit area, and wherein the adsorptive membrane comprises: a support member having a plurality of first pores; and a first adsorptive member which is stacked on the support member and has a plurality of second pores formed therein and which is made by accumulating ion exchange nanofibers for adsorbing foreign substances.

The gas filter according to an embodiment of the present disclosure may further include a strength reinforcing member fixed to one or either surface of the adsorptive membrane and having passages through which the gas passes.

In the gas filter according to an embodiment of the present disclosure, the strength reinforcing member may have a plurality of throughholes functioning as the passages which are regularly arranged or may have a mesh structure.

In the gas filter according to an embodiment of the present disclosure, the strength reinforcing member may be made of a metallic material or a non-metallic material.

In the gas filter according to an embodiment of the present disclosure, the strength reinforcing member may have a shape resembling the shape of the adsorptive membrane having a corrugated structure folded in a number of times or a structure having a plurality of projections.

In the gas filter according to an embodiment of the present disclosure, the support member may be a nonwoven fabric or a woven fabric.

In the gas filter according to an embodiment of the present disclosure, the first pore size may be larger than the second pore size.

In the gas filter according to an embodiment of the present disclosure, the ion exchange nanofibers may be cation exchange nanofibers or anion exchange nanofibers.

In the gas filter according to an embodiment of the present disclosure, the ion exchange nanofibers may be cation exchange nanofibers or anion exchange nanofibers, and the gas filter may further comprise a second adsorptive member which is stacked on the first adsorptive member and has a plurality of third pores formed, and which is made by accumulating other ion exchange nanofibers that exchange ions of opposite polarity with those of the ion exchange nanofibers for the first adsorptive member.

The gas filter according to an embodiment of the present disclosure may further include a nanofiber web, which is stacked on the first adsorptive member and has a plurality of pores, and which is made by accumulating nanofibers containing dopamine having a functional group for adsorbing foreign substances.

Here, the nanofiber web may have the functional group attached to the dopamine by a UV irradiation, a plasma treatment, an acid treatment, or a base treatment on a web prepared by electrospinning a spinning solution formed by mixing the dopamine with a solvent and a polymer substance. Here, the functional group may be a negative charge functional group or a positive charge functional group.

In the gas filter according to an embodiment of the present disclosure, the ion exchange nanofibers may be coated with oil.

In the gas filter according to an embodiment of the present disclosure, the thickness of the first adsorptive member may be designed to be smaller than the thickness of the support member.

In the gas filter according to an embodiment of the present disclosure, one or either of the support member and the first adsorptive member may further include a stitched silver yarn.

According to another aspect of the present disclosure, there is provided a gas filter comprising an adsorptive membrane for adsorbing foreign substances contained in a gas, wherein the adsorptive membrane has a corrugated structure folded in a number of times or a structure having a plurality of projections, in order to increase a contact surface area of the gas per unit area, and wherein the adsorptive membrane comprises: a support member having a plurality of first pores; a first adsorptive member which is stacked on the support member and has a plurality of second pores formed therein and which is made by accumulating ion exchange nanofibers for adsorbing foreign substances; and a second adsorptive member which is stacked on the first adsorptive member and has a plurality of third pores formed therein and which is made by accumulating ion exchange nanofibers containing an antibacterial substance.

Here, the second and third pore sizes may be smaller than the first pore size, and the antibacterial substance may be a silver nanomaterial, and the second adsorptive member may have a nanofiber web structure formed by electrospinning a spinning solution prepared by dissolving the silver nanomaterial in an organic solvent together with a fiber formability polymer material.

Further, in the gas filter according to an embodiment of the present disclosure, the gas filter may further include a strength reinforcing member fixed to one or either surface of the adsorptive membrane, and having passages through which the gas passes, wherein the strength reinforcing member may have a plurality of throughholes functioning as the passages which are regularly arranged or may have a mesh structure.

In addition, in the gas filter according to an embodiment of the present disclosure, the strength reinforcing member may be made of a metal material or a non-metallic material, and the strength reinforcing member may have a shape resembling the shape of the adsorptive membrane having a corrugated structure folded in a number of times or a structure having a plurality of projections.

Advantageous Effects

According to some embodiments of the present disclosure, a gas filter is realized into a corrugated structure or a structure in which a plurality of projections are formed, thereby increasing a contact surface area of the gas per unit area. Therefore, there are advantages of maximizing the flow rate of the gas and improving the adsorption performance of the foreign substances.

According to some embodiments of the present disclosure, deformation and damage of the adsorptive membrane can be prevented by fixing the adsorptive membrane to the strength reinforcing member, even when gas at a high speed and a large flow rate is passed, to thus improve the reliability of the gas filter.

According to some embodiments of the present disclosure, there are advantages that it is possible to adsorb ionic foreign substances in the ion exchange nanofibers of the adsorptive member and to physically filter the foreign substances having a size larger than the pore sizes of the pores of the support member and the pores of the adsorptive member to improve the adsorption efficiency of the foreign substances.

According to some embodiments of the present disclosure, the adsorptive member having the plurality of pores formed by the nanofibers is laminated on the support member having the plurality of pores to realize a membrane, thereby making it possible to improve the adsorption performance while preserving the passing flow rate.

According to some embodiments of the present disclosure, it is possible to realize a gas filter capable of being manufactured at low cost with excellent handling properties and strength by laminating the adsorption member and the support member.

According to some embodiments of the present disclosure, there are advantages that heavy metals, bacteria, and viruses contained in a passing gas may be adsorbed by nanofiber webs that are formed by accumulating nanofibers containing dopamine to which a functional group is attached, in which the nanofiber webs are included in the membrane.

According to some embodiments of the present disclosure, the membrane contains the adsorptive member formed by accumulating nanofibers containing a large number of pores and antibacterial substances, or the membrane undergoes a silver yarn stitching process, to thus improve an antibacterial property.

BEST MODE

Hereinafter, embodiments of the present disclosure will be described in detail with reference to the accompanying drawings.

According to some embodiments of the present disclosure, the gas filter includes an adsorptive membrane for adsorbing foreign substances contained in a gas to be passed therethrough. The adsorptive membrane includes an adsorptive member formed by accumulating ion exchange nanofibers, so that ionic foreign substances may be adsorbed, and the adsorptive membrane has a large number of pores so that foreign substances larger than the pore size may be physically filtered to thus restrain the foreign substances in the adsorptive membrane to then be adsorbed.

According to some embodiments of the present disclosure, the gas filter includes an adsorptive membrane to be described later and can be made into a gas filter having a predetermined shape by giving a structural characteristic to the adsorptive membrane in order to maximize the flow rate of the gas, or can be made into a gas filter which can be manufactured by fixing the adsorptive membrane to a case member having a shape capable of preserving the flow rate.

Figure 1:
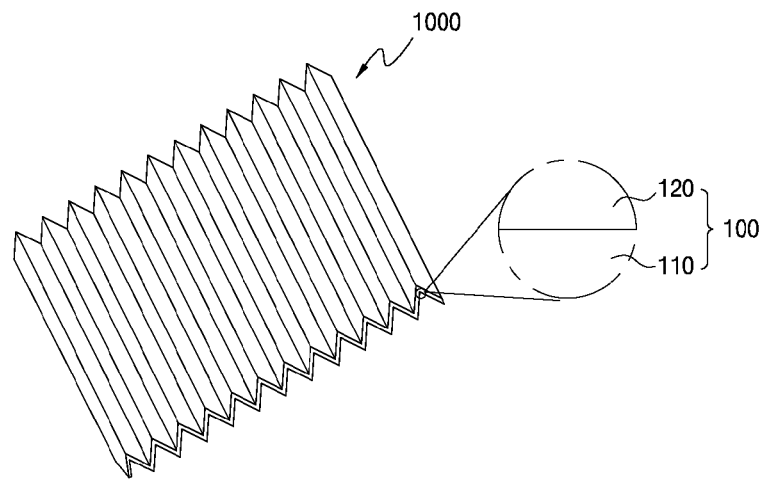
FIG. 1 is a schematic perspective view of a gas filter using an adsorptive membrane applied according to an embodiment of the present disclosure.

That is, as shown in FIG. 1, the gas filter 1000 is formed into a corrugated structure in an exemplary shape that maximizes the flow rate by increasing a surface area of contact of the gas per unit area.

The gas filter 1000 has a corrugated structure formed by molding a flat plate-shaped adsorptive membrane 100, and is structurally characterized in that the flat plate-shaped adsorptive membrane 100 has a folded shape in which corrugations are folded many times.

Therefore, since the large-sized flat plate-shaped adsorptive membrane 100 can be realized into a small-sized gas filter 1000 by a corrugated structure and can be positioned on the small-area gas flow path, a surface area through which the gas contacts and passes per unit area is increased, so that the performance of purifying the gas by the adsorption principle in the adsorptive membrane 100 can be improved and the flow rate of the gas can be increased.

Here, the adsorptive membrane 100 includes: a support member 110 having a plurality of first pores; and an adsorptive member 120 which is stacked on the support member 110 and formed with a plurality of second pores and which is formed by accumulating ion exchange nanofibers for adsorbing foreign substances.

Figure 2:
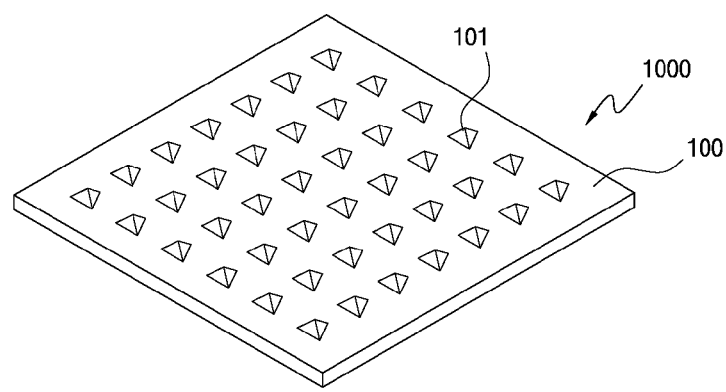
FIG. 2 is a schematic perspective view showing another structure of a gas filter using an adsorptive membrane applied according to an embodiment of the present disclosure.

Referring to FIG. 2, in some embodiments of the present invention, a gas filter can be realized by forming a plurality of projections on a flat plate-shaped adsorptive membrane. These projections are intended to increase a contact surface area with the gas.

Figure 3A:
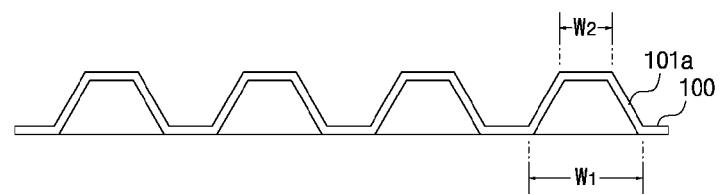
FIGS. 3A and 3B are partial cross-sectional views illustrating a state in which a plurality of projections are formed on an adsorptive membrane applied according to an embodiment of the present disclosure.
Figure 3B:

As shown in FIG. 3A, the projections 101a of the gas filter preferably has a wave shape in which the width W1 of the lower portion is larger than the width W2 of the upper portion. A cross-sectional shape of crosssecting the projection 101a in the vertical direction has a triangle (the projection 101b in FIG. 3B), a quadrangle, or a semicircle.

As described above, when the gas filter is implemented solely by the adsorptive membrane, the strength of the adsorptive membrane is weak, and thus when a gas at a high rate and a large flow rate is delivered to the adsorptive membrane, the adsorptive membrane is deformed or damaged, and thus there is a possibility of reducing reliability.

Figure 4A:
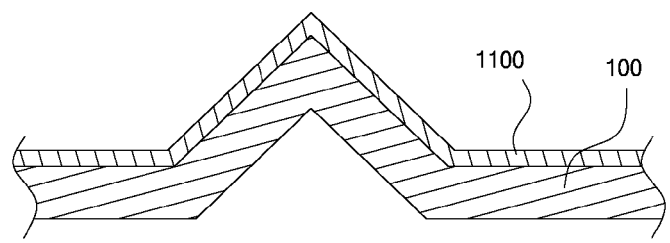
FIGS. 4A and 4B are partial cross-sectional views of a gas filter including a strength reinforcing member applied according to embodiments of the present disclosure.
Figure 4B:
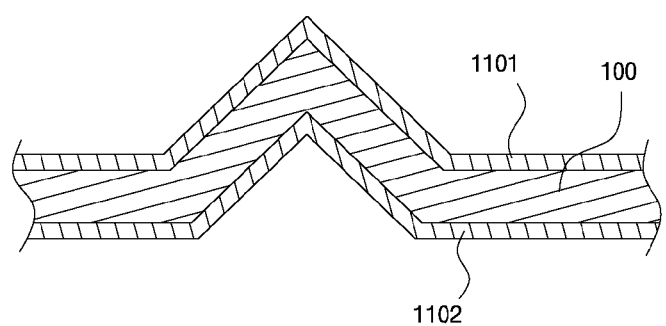

Accordingly, in some embodiments of the present disclosure, a gas filter including a strength reinforcing member can be realized. That is, as shown in FIG. 4A, the strength reinforcing member 1100 may be fixed to one surface of the adsorptive membrane 100, or as shown in FIG. 4B, the strength reinforcing members 1101 and 1102 may be fixed on one surface and the other surface of the adsorptive membrane 100.

In this case, it is preferable that the strength reinforcing members 1100, 1101, and 1102 have a corrugated structure having the same shape as the adsorptive membrane 100 or a flat plate-shaped structure having a plurality of projections formed thereon. Passages through which gas passes are provided in the strength reinforcing members 1100, 1101, and 1102.

Such strength reinforcing members 1100, 1101, and 1102 can be made of a metal material or a non-metallic material. Here, as the non-metallic material, for example, plastic that can be molded can be used.

Figure 5A:
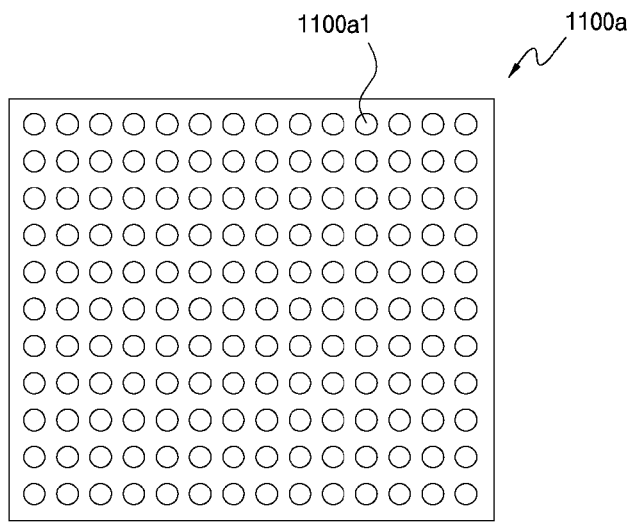
FIGS. 5A and 5B are plan views for explaining modifications of a strength reinforcing member applied according to embodiments of the present disclosure.
Figure 5B:
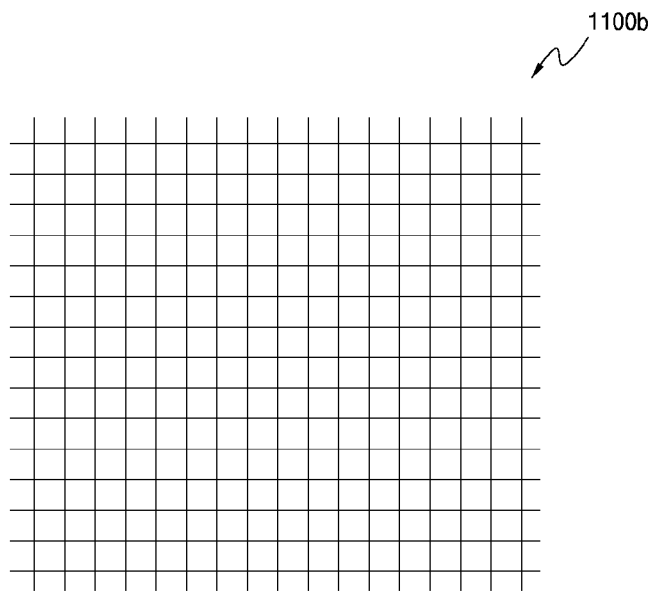

Referring to FIGS. 5A and 5B, the strength reinforcing member can be realized into a strength reinforcing members 1100a in which a plurality of throughholes 1101a1 functioning as passages for gas passage are regularly arranged (FIG. 5A), or as shown in FIG. 5B, it can be realized into a strength reinforcing member 1100b having a mesh structure enabling a smooth gas passage. Here, the shapes of the throughholes 1101a1 can be variously designed.

Figure 6:
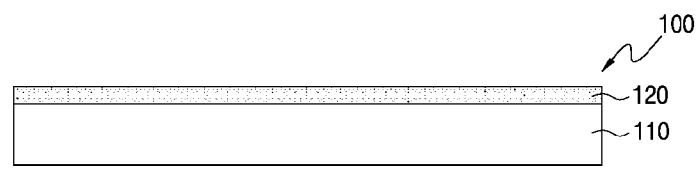
FIG. 6 is a cross-sectional view of an adsorptive membrane applied to a gas filter according to a first embodiment of the present disclosure.

Referring to FIG. 6, the adsorptive membrane 100 applied to the gas filter according to the first embodiment of the present disclosure includes: a support member 110 having a plurality of first pores; and an adsorptive member 120 which is stacked on the support member 110 and has a plurality of second pores formed therein, and which is made by accumulating ion exchange nanofibers for adsorbing foreign substances.

The adsorptive membrane 100 absorbs and filters ionic foreign substances by the ion exchange nanofibers of the adsorption member 120 and physically filters the foreign substances (for example, dirt, dust, debris, particles, etc.) having a size larger than the pore size by the first pores of the support member 110 and the second pores of the adsorptive member 120, to thus enhance the removal efficiency of the foreign substances.

Figure 7:
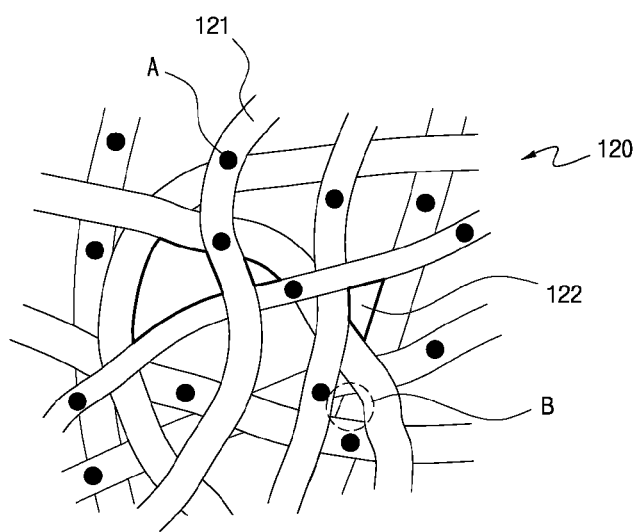
FIG. 7 is a schematic view for explaining the principle of adsorption of foreign substances to an adsorptive member of an adsorptive membrane applied to a gas filter according to an embodiment of the present disclosure.

In other words, as shown in FIG. 7, when the gas is passed through the adsorptive membrane 100, the ionic foreign substances A contained in the gas are adsorbed by the ion exchange nanofibers 121 of the adsorptive member 120, and the large-size foreign substances B included in the gas do not pass through the second pores 122 of the adsorptive member 120 and are trapped inside the adsorptive member 120. As a result, the foreign substances A and B are restrained in the adsorption state (the state that the foreign substances cannot escape from and stick to the inside of the adsorptive member 120) in the adsorptive membrane 100, and thus the filtering performance of the adsorptive membrane 100 according to some embodiments of the present disclosure may be increased.

Here, the second pores 122 of the adsorptive member 120 can adsorb and filter nano-scale fine contaminants contained in the gas as micropores. That is, the adsorptive member 120 made of nanofibers performs adsorption by surface filtration on the surface layer and by deep filtration on the inner layer.

Therefore, the adsorptive membrane applied to the gas filter according to an embodiment of the present disclosure is not a non-porous membrane structure, and is realized by laminating an adsorptive member having a plurality of pores made by nanofibers on a support member having a plurality of pores, to thereby provide some advantages of enhancing a filtering performance while preserving the flow rate.

In addition, in some embodiments of the present disclosure, the large-size foreign substances B contained in the gas do not pass through even the first pores of the support member 110 but are filtered therethrough. Here, the first pore size of the support member 110 is preferably larger than the second pore size 122 of the adsorptive member 120.

The support member 110 serves as a passageway for passing the gas through the plurality of first pores and serves as a support layer for supporting the adsorptive member 120 to maintain the flat plate shape. Here, the support member 110 is preferably a nonwoven fabric or a woven fabric.

The usable nonwoven fabric may be any one of a melt-blown nonwoven fabric, a spun bond nonwoven fabric, a thermal bond nonwoven fabric, a chemical bond nonwoven fabric, and a wet-laid nonwoven fabric. The fiber diameter of the nonwoven fabric may be 40 μm to 50 μm, and the pore size thereof may be 100 μm or more.

In addition, in some embodiments of the present disclosure, since the adsorptive member 120 made by accumulating ion exchange nanofibers has poor handleability and strength, the adsorptive member 120 and the support member 110 are laminated to thereby implement an adsorptive membrane having excellent handleability and strength.

Meanwhile, since the adsorptive member 120 made by accumulating the ion exchange nanofibers is expensive, implementing of the adsorptive membrane 100 in some embodiments of the present disclosure only by using the sole adsorptive member 120, requires a lot of manufacturing cost. Therefore, in some embodiments of the present disclosure, it is possible to reduce the manufacturing cost by stacking the supporting member, which is much cheaper than the adsorptive member 120 made by accumulating the ion exchange nanofibers, on the adsorptive member 120. In this case, the expensive adsorptive member 120 is designed to be thin and the low-priced support member 110 is designed to be thick, so that the manufacturing cost can be optimized at low cost.

In some embodiments of the present disclosure, an ion exchange solution is electrospun to discharge ion exchange nanofibers to the support member, and the discharged ion exchange nanofibers are accumulated in the support member 110 to produce the adsorptive member 120.

The ion exchange solution can be defined as a solution synthesized by a synthesis process such as bulk polymerization of a polymer, a solvent and ion exchange functional groups.

Since the ion exchange functional groups are contained in the ion exchange nanofibers, ionic foreign substances such as heavy metals contained in the gas passing through the adsorptive membrane 100 are exchanged by substitution and adsorbed to the ion exchange functional groups. As a result, the ionic foreign substances are adsorbed to the ion exchange nanofibers by the ion exchange functional groups.

For example, when the ion exchange functional groups are $SO_3H$, and/or $NH_4CH_3$, the ionic foreign substances (for example, ionic heavy metal positive ions or heavy metal negative ions) contained in water are replaced with $H^+$ and/or $CH_3^+$ by substitution, and adsorbed to the ion exchange functional groups.

Here, the ion exchange functional groups include a cation exchange functional group selected from a sulfonic acid group, a phosphoric acid group, a phosphonic group, a phosphonic group, a carboxylic acid group, an arsonic group, a selenonic group, an iminodiacetic acid group and a phosphoric acid ester group; or an anion exchange functional group selected from a quaternary ammonium group, a tertiary amino group, a primary amino group, an imine group, a tertiary sulfonium group, a phosphonium group, a pyridyl group, a carbazolyl group and an imidazolyl group.

Here, the polymer is a resin that is capable of being electrospun, capable of being dissolved in an organic solvent for electrospinning, and capable of forming nanofibers by electrospinning, but is not particularly limited thereto. For example, the polymer material may include: polyvinylidene fluoride (PVdF), poly (vinylidene fluoride-co-hexafluoropropylene), perfluoropolymers, polyvinyl chloride or polyvinylidene chloride, and co-polymers thereof; polyethylene glycol derivatives containing polyethylene glycol dialkylether and polyethylene glycol dialkyl ester; polyoxide containing poly (oxymethylene-oligo-oxyethylene), polyethylene oxide and polypropylene oxide; polyacrylonitrile co-polymers containing polyvinyl acetate, poly (vinyl pyrrolidone-vinyl acetate), polystyrene, polystyrene acrylonitrile co-polymers, polyacrylonitrile (PAN), and polyacrylonitrile methyl methacrylate co-polymers; and polymethyl methacrylate and polymethyl methacrylate co-polymers, and a mixture thereof.

In addition, examples of the usable polymer may include: aromatic polyester such as polyamide, polyimide, polyamide-imide, poly (meta-phenylene iso-phthalamide), polysulfone, polyether ketone, polyethylene terephthalate, polytrimethylene terephthalate, and polyethylene naphthalate; polyphosphazenes such as polytetrafluoroethylene, polydiphenoxy phosphazene, and poly {bis [2-(2-methoxyethoxy) phosphazene]}; polyurethane co-polymers including polyurethane and polyether urethane; cellulose acetate, cellulose acetate butylrate, cellulose acetate propionate, and the like.

As the polymer preferable for the adsorptive member, PAN, polyvinylidene fluoride (PVdF), polyester sulfone (PES) and polystyrene (PS) may be used alone or a mixture of polyvinylidene fluoride (PVdF) and polyacrylonitrile (PAN), or a mixture of PVDF and PES, and a mixture of PVdF and thermoplastic polyurethane (TPU) may be used.

As the solvent, a mono-component solvent such as dimethylformamide (DMF) can be used. However, when a two-component solvent is used, it is preferable to use a two-component solvent in which a high boiling point (BP) solvent and a low boiling point (BP) solvent are mixed with each other.

As described above, a plurality of ultrafine pores (i.e., second pores) are formed between the ion exchange nanofibers that are accumulated randomly in the adsorptive member 120 which is formed by accumulating the ion exchange nanofibers in the support member 110. The ultrafine pore size is preferably 3 μm or less.

The diameter of each of the ion exchange nanofibers is preferably in the range of 0.1 μm to 3.0 μm, and the thickness of the adsorptive member 120 is freely adjusted according to a spinning time from an electrospinning apparatus. The pore size is determined according to the thickness of the adsorptive member 120.

The ion exchange nanofibers can be defined as having ion exchange functional groups having ion exchange ability on the surface thereof. Depending on the ions exchanged in the ion exchange functional groups, the ion exchange nanofibers can be cation exchange nanofibers or anion exchange nanofibers.

The adsorptive member 120 formed by accumulating the ion exchange nanofibers is a web structure of ion exchange nanofibers. The web is ultra-thin, ultra-light in weight, and large in specific surface area.

In some embodiments of the present disclosure, the ion exchange nanofibers are accumulated in the support member 110 by electrospinning the ion exchange nanofibers to form the adsorptive member 120, thereby increasing a coupling force between the support member 110 and the absorptive member 120. Accordingly, there is an advantage that the adsorptive member 120 can be prevented from being peeled off from the support member 110 by external force.

Figure 8:
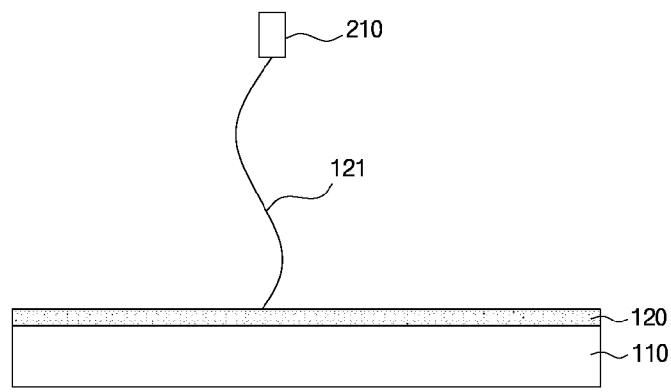
FIG. 8 is a view schematically showing a state in which ion exchange nanofibers are accumulated by electrospinning a spinning solution to a support member according to an embodiment of the present disclosure.

In other words, as shown in FIG. 8, the ion exchange nanofibers 121 discharged from a spinning nozzle 210 of the electrospinning apparatus are stacked on the supporting member 110, and the stacked ion exchange nanofibers 121 are accumulated, and thus a web-shaped adsorptive member 120 is formed.

FIGS. 9 to 12 are cross-sectional views of the adsorptive membrane applied to the gas filter according to the second to fifth embodiments of the present disclosure, respectively.

Figure 9:
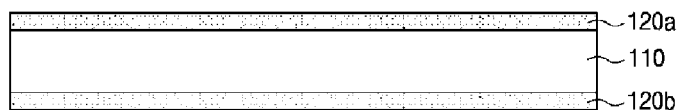
FIG. 9 is a cross-sectional view of an adsorptive membrane applied to a gas filter according to a second embodiment of the present disclosure.

Referring to FIG. 9, an adsorptive membrane applied to a gas filter according to the second embodiment of the present disclosure includes: a support member 110 having a plurality of first pores; a first adsorptive member 120a stacked on an upper surface of the support member 110 and having a plurality of second pores formed therein and made by accumulating ion exchange nanofibers for adsorbing foreign substances; and a second adsorptive member 120b stacked on a lower surface of the support member 110 and having a plurality of third pores formed therein and made by accumulating ion exchange nanofibers for adsorbing foreign substances.

The adsorptive membrane applied in a gas filter according to the second embodiment is configured to include first and second adsorptive members 120a and 120b that are laminated on both sides of the support member 110 to adsorb the ionic foreign substances not adsorbed by the first adsorption member 120a, and foreign substances having pore sizes larger than the pore sizes of the third pores by the second adsorptive member 120b, thereby increasing the adsorption efficiency of foreign substances.

Here, the first pore size may be designed to be the largest, the second pore size may be designed to have an intermediate size between the first pore size and the third pore size, and the third pore size may be designed to be the smallest.

Figure 10:
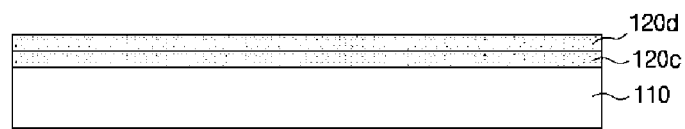
FIG. 10 is a cross-sectional view of an adsorptive membrane applied to a gas filter according to a third embodiment of the present disclosure.

Referring to FIG. 10, an adsorptive membrane applied to a gas filter according to the third embodiment of the present disclosure includes: a support member 110 having a plurality of first pores; a first adsorptive member 120c stacked on an upper surface of the support member 110 and having a plurality of second pores formed therein and made by accumulating first ion exchange nanofibers for adsorbing foreign substances; and a second adsorptive member 120d stacked on an upper surface of the first adsorptive member 120c and having a plurality of third pores formed therein and made by accumulating second ion exchange nanofibers for adsorbing foreign substances.

The first ion exchange nanofibers of the first adsorptive member 120c may be cation exchange nanofibers or anion exchange nanofibers, and the second ion exchange nanofibers of the second adsorptive member 120d may be nanofibers that exchange ions of opposite polarity to the first ion exchange nanofibers. That is, when the first ion exchange nanofibers are cation exchange nanofibers, the second ion exchange nanofibers are anion exchange nanofibers.

Therefore, the adsorptive membrane applied in a gas filter according to the third embodiment is advantageous in that both the cation heavy metal and anion heavy metal contained in the passing gas can be adsorbed by the first and second adsorptive members 120c and 120d.

Figure 11:
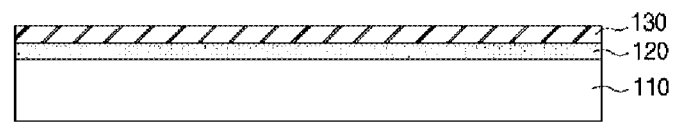
FIG. 11 is a cross-sectional view of an adsorptive membrane applied to a gas filter according to a fourth embodiment of the present disclosure.

Referring to FIG. 11, an adsorptive membrane applied to a gas filter according to the fourth embodiment of the present disclosure includes: a support member 110 having a plurality of first pores; a first adsorptive member 120 stacked on an upper surface of the support member 110 and having a plurality of second pores formed therein and made by accumulating ion exchange nanofibers for adsorbing foreign substances; and a second adsorptive member 130 stacked on an upper surface of the first adsorptive member 120 and having a plurality of third pores formed therein and made by accumulating nanofibers containing an antibacterial substance.

The adsorptive membrane applied in the gas filter according to the fourth embodiment can adsorb ionic foreign substances by the ion exchange nanofibers of the first adsorptive member 120 and can have the antibacterial property by the nanofibers containing the antibacterial substance of the second adsorptive member 130.

Here, the second and third pore sizes are preferably designed to be smaller than the first pore size.

The adsorptive membrane can also physically filter and adsorb foreign substances having a size larger than the pore size in each of the first to third pores.

Here, the antibacterial substances are preferably silver nanomaterials. Here, silver nanomaterials are silver (Ag) salts such as silver nitrate ($AgNO_3$), silver sulfate ($Ag_2SO_4$), and silver chloride (AgCl).

In some embodiments of the present disclosure, a silver nanomaterial is dissolved in an organic solvent together with a fiber formability polymer material to prepare a spinning solution, and the spinning solution is electrospun to obtain a second adsorptive member 130 of a nanofiber web structure formed by accumulating nanofibers containing an antibacterial substance.

In the adsorptive membrane applied in a gas filter according to the fifth embodiment of the present disclosure may further include a nanofiber web, which has a plurality of pores, and which is made by accumulating nanofibers containing dopamine having a functional group for adsorbing foreign substances. Here, the nanofiber web containing dopamine is preferably laminated on the adsorptive member.

Figure 12:
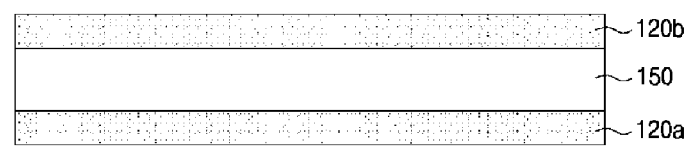
FIG. 12 is a cross-sectional view of an adsorptive membrane applied to a gas filter according to a fifth embodiment of the present disclosure.

For example, as shown in FIG. 12, the adsorptive membrane may be implemented by interposing a nanofiber web 150 between the first and second adsorptive members 120a and 120b, in which the nanofiber web 150 is made by accumulating nanofibers having a plurality of pores formed and containing dopamine, to which a functional group capable of adsorbing foreign substances is attached.

Here, the first and second adsorptive members 120a and 120b are adsorptive members formed by accumulating ion exchange nanofibers having a plurality of pores and adsorbing foreign substances, and the nanofiber web 150 is produced by electrospinning a spinning solution which is made by mixing a dopamine monomer or polymer, a solvent and a polymer substance.

Dopamine (i.e. 3,4-dihydroxyphenylalamine) has a structure in which —$NH_2$ and —OH are bonded to a benzene ring.

The functional groups attached to the dopamine contained in the nanofibers can be formed by a post-treatment such as UV irradiation, plasma treatment, acid treatment, and base treatment after forming a nanofiber web containing a dopamine monomer or polymer. Finally, the nanofiber web containing dopamine is in a state where the functional group is attached to the nanofiber.

Here, the functional group can function as a negative charge functional group such as $SO_3H^-$ or a positive charge functional group such as $NH_4^+$ to adsorb heavy metals, bacteria and viruses. Thus, the adsorptive membrane applied in a gas filter according to the fifth embodiment of the present disclosure can filter heavy metals, bacteria and viruses contained in the passing gas and adsorb the filtered heavy metals, bacteria and viruses inside the adsorptive membrane.

Figure 13:
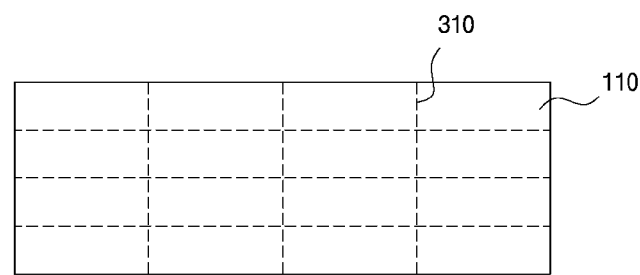
FIG. 13 is a schematic plan view for explaining a state in which a silver yarn stitching process is applied on an adsorptive membrane applied to a gas filter according to an embodiment of the present disclosure.

FIG. 13 is a schematic plan view for explaining a state in which a silver yarn stitching process is applied on an adsorptive membrane applied to a gas filter according to an embodiment of the present disclosure.

According to the embodiments of the present disclosure, the adsorptive membrane including the support member can be subjected to a silver yarn stitching process to realize an adsorptive membrane having antimicrobial properties by the stitched silver yarn. Here, the silver yarn stitching process may be performed on one or both of the support member and the adsorptive member of the adsorptive membrane.

Here, since the adsorptive member of the adsorptive membrane has a relatively lower strength than the support member, if the silver yarn is stitched to the adsorptive member, damage to the adsorptive member may be caused by the stitched silver yarn.

Meanwhile, the support member has a strength enough to withstand the silver yarn stitching process, thereby stitching the silver yarn 310 on the support member 110, as shown in FIG. 13. In this case, it is preferable that the silver yarn 310 is stitched in a lattice pattern, but it is not limited thereto.

The silver yarn is a thread made of silver. The silver yarn stitched to the support member 110 can kill the bacteria contained in the passing gas, and the adsorptive membrane can have a strong antibacterial property.

Meanwhile, in some embodiments of the present disclosure, the nanofibers of the adsorptive member of the adsorptive membrane of the above-described embodiments may be coated with an oil such as glycerin.

Since the adsorptive member has a web shape in which ion exchange nanofibers are accumulated, the nanofibers are coated with oil in order to activate adsorption of ion exchange functional groups present on the surfaces of ion exchange nanofibers, to thereby adsorb ionic foreign substances by the oil, and then by the exchange functional groups.

While the present invention has been particularly shown and described with reference to exemplary embodiments thereof, by way of illustration and example only, it is clearly understood that the present invention is not to be construed as limiting the present invention, and various changes and modifications may be made by those skilled in the art within the protective scope of the invention without departing off the spirit of the present invention.

INDUSTRIAL APPLICABILITY

The present disclosure is applicable to a gas filter which maximizes the flow rate of gas, prevents deformation or damage of the adsorptive membrane, improves the adsorption efficiency, and obtains excellent reliability.

What is claimed is:

1. A gas filter comprising:
an adsorptive membrane for adsorbing foreign substances contained in a gas, wherein the adsorptive membrane comprises: a support member having a plurality of first pores, the support member strengthening the adsorptive membrane and formed of a non-woven fabric; and a first adsorptive member which is stacked on the support member and has a plurality of second pores formed therein, the first adsorptive member adsorbing the foreign substances of the gas, the second pores being smaller that the first pores; and
a strength reinforcing member fixed to one or both surfaces of the adsorptive membrane and having passages through which the gas passes, the strength reinforcing member being formed of a plastic material,
wherein the first adsorptive member is formed of accumulated electrosupun ion exchange nanofibers, the accumulated electrosupun ion exchange nanofibers being made of a polymer including a first ion-exchange functional group, and
wherein the adsorptive membrane includes: a flat plate-shaped adsorptive membrane having a plurality of projections formed thereon, the plurality of projections are dispersed on the flat-shaped adsorptive membrane, each projection is spaced apart from surrounding projections, and the strength reinforcing member has a structure conforming to the plurality of projections.

2. The gas filter of claim 1, wherein the adsorptive membrane further comprises: a second adsorptive member which is stacked on the first adsorptive member and has a plurality of third pores, and
wherein the second adsorptive member includes: a second ion exchange functional group having an opposite polarity to the first ion exchange functional group.

3. The gas filter of claim 1, further comprising: a nanofiber web, which is stacked on the first adsorptive member and has a plurality of third pores, and which is made of accumulated nanofibers containing dopamine having a functional group for adsorbing the foreign substances.

4. The gas filter of claim 1, wherein one or both of the support member and the first adsorptive member further includes a stitched silver yarn.

5. The gas filter of claim 1, wherein the first accumulated electrosupun ion exchange nanofibers are coated with oil.

6. The gas filter of claim 1, wherein the adsorptive membrane further comprises: a second adsorptive member which is stacked on the first adsorptive member and has a plurality of third pores formed therein, and the second adsorptive member is made of accumulated electro spun nanofibers containing an antibacterial substance.

7. The gas filter of claim 6, wherein the third pores are smaller than the first pores.

8. The gas filter of claim 6, wherein the antibacterial substance includes a silver nanomaterial.

9. The gas filter of claim 8, wherein the second adsorptive member has a nanofiber web structure.

* * * * *